United States Patent [19]
Dhein

[11] Patent Number: 5,769,397
[45] Date of Patent: Jun. 23, 1998

[54] VEHICLE LIFTER ATTACHMENT

[76] Inventor: Scott Dhein, 901 Dairyland Dr., Cleveland, Wis. 53015

[21] Appl. No.: 732,070

[22] Filed: Oct. 18, 1996

[51] Int. Cl.⁶ ........................................ B66F 3/00
[52] U.S. Cl. ........................................ 254/134
[58] Field of Search .............. 254/133 R, 134, 254/8 R, 8 B, DIG. 4

[56] References Cited

U.S. PATENT DOCUMENTS

| | | | |
|---|---|---|---|
| 2,747,837 | 5/1956 | Turner | 254/134 |
| 2,903,258 | 9/1959 | Jovanovich | 254/134 |
| 4,570,905 | 2/1986 | Gerstner | 254/134 |
| 4,607,823 | 8/1986 | Thomas | 254/134 |
| 4,793,592 | 12/1988 | Green et al. | 254/134 |
| 4,964,617 | 10/1990 | Lawrence | 254/133 R |
| 5,294,098 | 3/1994 | Bundy | 254/134 |
| 5,588,639 | 12/1996 | Holman | 254/133 R |

*Primary Examiner*—Robert C. Watson
*Attorney, Agent, or Firm*—Andrus, Sceales, Starke & Sawall

[57] ABSTRACT

There is described an attachment for a jack or a similar wheeled-vehicle lifting device, which is particularly suitable for use in lifting motorcycles, mopeds or other two-wheeled vehicles, and for supporting said vehicle in an elevated position on said jack. The attachment includes a plurality of adjustable brackets, slidably arranged in a plurality of slots in a base plate, and arranged so that the attachment can be securely fastened to a wide variety of makes and models of motorcycles.

6 Claims, 2 Drawing Sheets

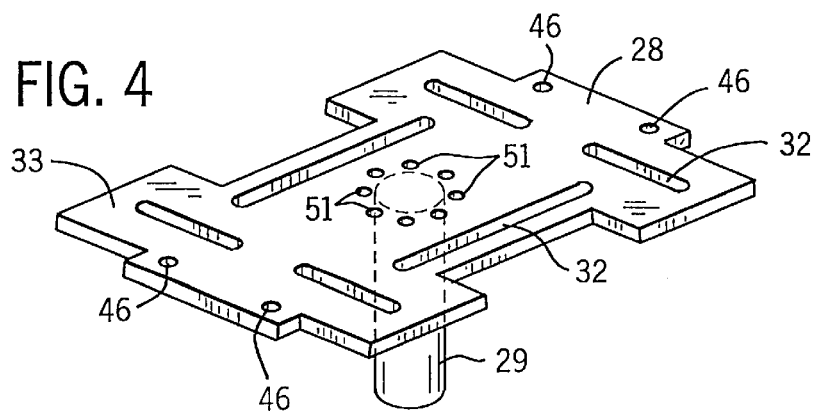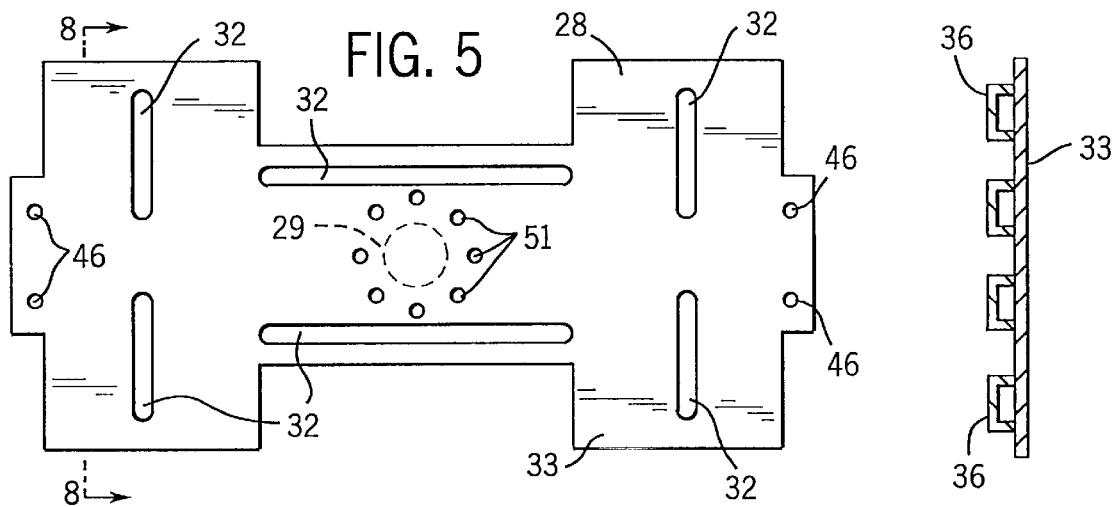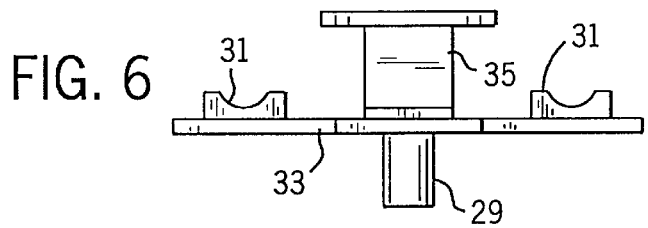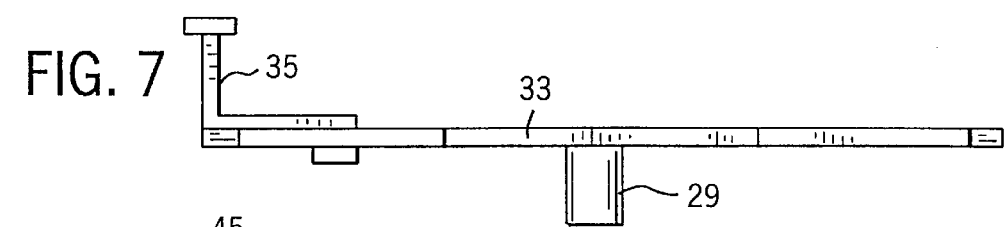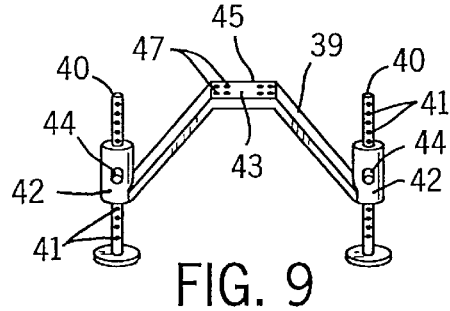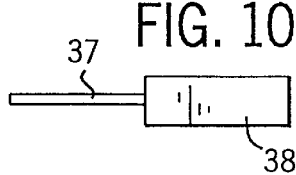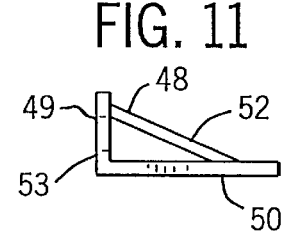

VEHICLE LIFTER ATTACHMENT

FIELD OF THE INVENTION

The present invention relates to an attachment for lifting devices or jacks in automobile service stations, or for use on or in connection with private, non-commercial jacks for lifting or elevating automobiles, motorcycles and the like. The lifting devices per se are well-known in the art, and the present invention is not directed to the jack or lifter per se, but to an attachment for such well-known devices which will enable the devices to be more effective in connection with elevating and supporting motorcycles or motor-powered, two-wheeled vehicles such as mopeds, bicycles, and the like.

BACKGROUND OF THE INVENTION

The prior art describes many and various jacks or lifting devices such as the center-post hydraulic lifts or scissors-type, articulated jacks, or screw-operated jacks.

Of direct interest in the operation of the device of the present invention, however, is the lifter or jack of FIG. 2, which is relatively small, convenient, portable and economically available to even the smallest of automobile repair shops, garage mechanics, private persons, or the like. These jacks may sell for about $200.00.

When lifting automobiles, these devices operate by placing the saddle of the jack underneath the automobile and beneath the axle near the wheel to be elevated, and thus depend upon the other three wheels of the vehicle to remain on the ground and provide stability for the vehicle while the jack is elevating one of the wheels.

This is basically true of the hydraulic, scissors-type, and the screw-operated devices as well.

Unfortunately, in a two-wheel vehicle such as a motorcycle or a moped, the vehicle is basically unstable when not moving, and especially so if one of the wheels is lifted or if, in fact, the entire vehicle is lifted off the ground by positioning the jack beneath the mid-point. As a result, most of the repair work done on motorcycles is done with a vehicle having both wheels on the floor or the ground, and this requires the mechanic or the owner of the vehicle doing the repairs to crouch down or bend, or generally assume an uncomfortable position while working on the vehicle.

SUMMARY OF THE INVENTION

It is an object of the present invention to provide an attachment for well-known jacks or lifting devices, and particularly that shown in FIG. 2, which will permit the jack to lift the entire vehicle off the ground and elevate it high enough so that the repair work on the motorcycle can be done in a comfortable position, while still maintaining the stability of the vehicle.

Therefore, the present invention comprises an attachment which is designed so that it has application and utility for a variety of jacks, as well as for use with a wide variety of models and makes of motorcycles, or other 2-wheel vehicles.

Thus an attachment is provided which can be securely fastened to the jack and which also includes brackets, arms, pillow blocks, and other fitings which insure that the motorcycle will be safely held in place at an elevated position while the work is being done on the machine.

With the above and other objects in view, further information and a better understanding of the present invention may be achieved by referring to the following detailed description.

For the purpose of illustrating the invention, there is shown in the accompanying drawings a form thereof which is at present preferred, although it is to be understood that the various instrumentalities of which the invention consists can be variously arranged and organized, and that the invention is not limited to the precise arrangement and organizations of the instrumentalities as herein shown and described.

BRIEF DESCRIPTION OF THE DRAWINGS

In the drawings, wherein like reference characters indicate like parts:

FIG. 4 is a perspective view of the jack attachment of the present invention.

FIGS. 5, 6 and 7 show a top view, an end view and a side view of the jack attachment or base plate of FIG. 4, illustrating the slots, pillow blocks, and brackets which make the invented device adaptable for a wide variety motorcycles of various brands and manufacturers' makes.

FIG. 8 is a cross-sectional view of the base plate showing brackets which can receive the arms of the oil drain pans or tool-holding pans of FIG. 10.

FIG. 9 is a perspective view of an auxiliary stand which can be attached to the base plate for additionally supporting the elevated motorcycle in a transverse direction.

FIG. 10 is a side elevational view of an oil drain pan or tool-holding pan having arms which can be slid into the brackets shown in FIG. 8.

FIG. 11 is a side elevational view of an outrigger or stabilizer which can be attached to the jack further to prevent tipping of the jack and the attachment when the motorcycle is elevated.

DESCRIPTION OF THE PREFERRED EMBODIMENT

Figure 2:
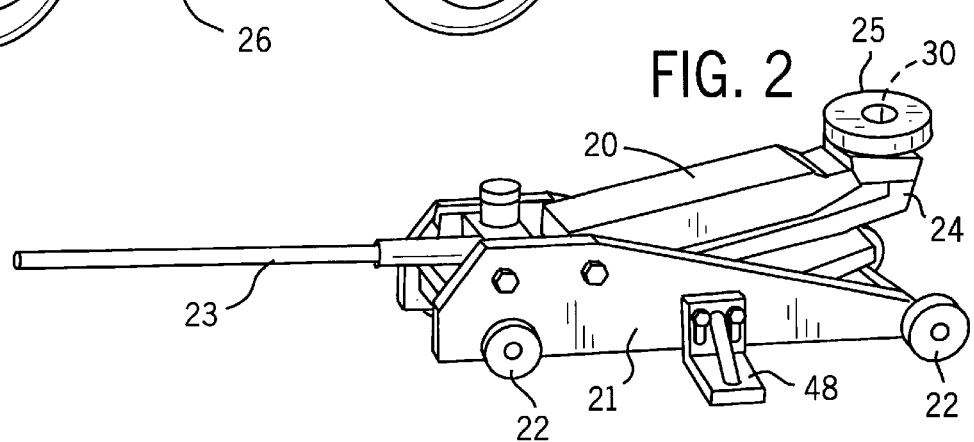
FIG. 2 is a perspective view of a service jack of the type for which the present invention is particularly adaptable.
Figure 3:
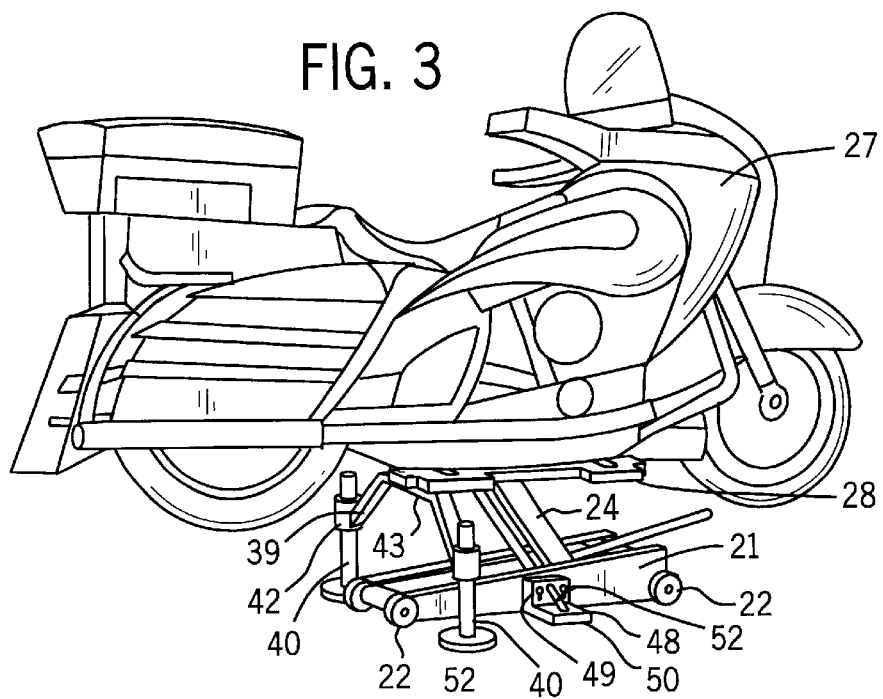
FIG. 3 is a side elevational view of a motorcycle having been elevated by a jack of FIG. 2 and the attachment of the present invention.

Referring now to the drawings, and particularly FIG. 2, there is seen a jack 20 most commonly used in automobile repair shops, which includes a base 21, mobility wheels 22, an operating handle 23, an arm 24, at the end of which is a removable saddle 25 held in place by a pin (not shown) which fits into a hole 30 in the arm 24.

Figure 1:
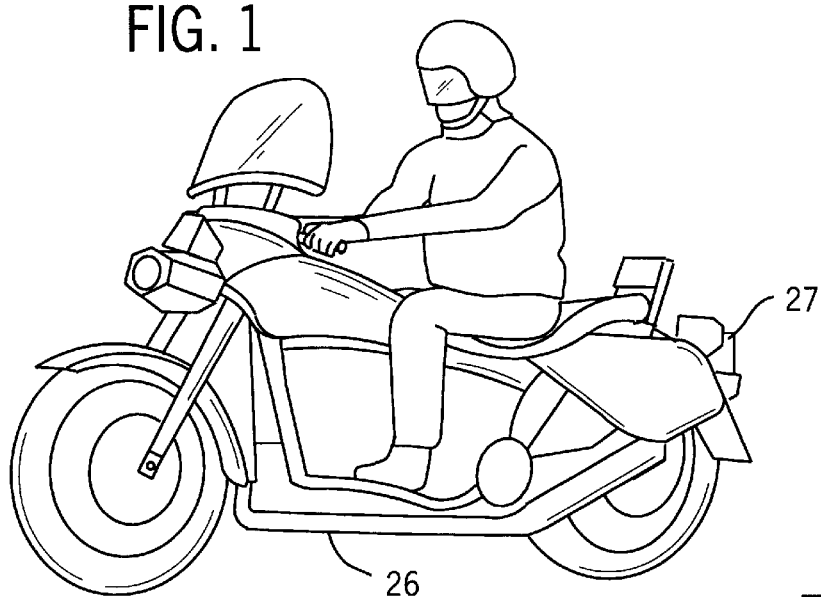
FIG. 1 is a perspective view of a motorcycle of the type for which the present invention has great utility.

Most frequently the motorcycle (of the type shown in FIG. 1) is elevated by placing the saddle 25 beneath the lower central portion of the frame 26 of the motorcycle 27 and then cranking the handle 23 which causes the arm 24 to rise.

However, with the device of the present invention, before that is done, the saddle 25 is removed from the arm 24 and the attachment 28 of the present invention is placed on the arm 24 by inserting a kingpin 29 into the hole 30 in the arm 24.

Then the jack 20 is placed underneath the motorcycle, and adjustable pillow blocks 31 which slide in slots 32 can be positioned beneath the motorcycle frame 26 in alignment with those parts of the motorcycle frame suitable for supporting the weight of the vehicle.

FIGS. 5, 6 and 7 show the base plate 33 of the attachment 28 with the king pin 29 extending beneath the base plate 33. A bracket 35 may be mounted on the base plate 33 to add additional support and such brackets 35 are usually specifically designed for a particular model of cycle. Thus a plurality of such brackets 35 can be provided so that the user can be prepared to service a variety of models of cycles.

The attachment 28 with the base plate 33 may also include clamps or pins or the like (not shown) to fasten the plate 33 to the cycle 27 and, because it is also secured to the arm 24 of the jack 20, when the jack is actuated and the arm 24 is elevated, the motorcycle 27 will be lifted without any danger of tilting or tipping or falling off the jack.

This enables the cycle to be elevated to a comfortable height where the mechanic or the operator can more easily and comfortably complete the maintenance procedures.

Understandably, it is possible to fasten the base plate 33 to the frame 26 of the motorcycle prior to interconnection with the arm 24 on the jack, and in many cases this is more convenient or comfortable for the mechanic because the jack itself is not in the way. After the connection of the base plate 33 to the motorcycle frame 26 is completed, the jack 20 can be brought beneath that portion of the motorcycle where the base plate is attached, and the kingpin 29 can be inserted into the hole 30. Then the arm 24 is elevated, lifting the motorcycle off the ground.

In FIG. 8 there is shown a cross-sectional view of the base-plate 33 showing a plurality of brackets 36 which can receive the arms 37 of an oil drain pan 38 (or similar accessory) to make the maintenance of the motorcycle more convenient.

In FIG. 9 there is shown an adjustable stand 39 which has legs 40 containing holes 41 so that the sleeves 42 of the connecting arm 43 can be moved to various positions along the legs 40 by inserting the pins 44 in appropriate positions.

Thus the arm 43 can be elevated so that the upper portion 45 is brought beneath the base plate 33 (after the base plate has been fastened to an appropriate portion of the motorcycle). Then the upper portion 45 of the arm 43 can be fastened to the base plate 33 by suitable bolts (not shown) which may pass through the holes 46 in base plate 33 and holes 47 in the upper arm portion 45, and then the jack can be lowered and removed for other purposes while the cycle is supported in a stable elevation on the stand 39.

FIG. 11 shows an outrigger 48 having a vertical portion 49 which can be fastened against the base 21 of the jack 20 with a horizontal portion 50 resting on the floor. An angled portion 52 connects the vertical portion 49 with the horizontal portion 50. The outrigger 48 prevents the jack from tipping sideways (i.e., across the narrow portion of the base 21 of the jack 20).

Holes 53 in the vertical portion 49 of the outrigger 48 can be slotted so that the outrigger can be suitably adjusted to the floor level and also so that the outrigger can be slid upwardly a small distance when the jack is used for other purposes than cycle lifting.

Because the base plate 33 is mounted on a kingpin 29 which can pivot in the hole 30 of arm 24 of the jack 20, the base plate 33 can be swivelled through 360 degrees to position the cycle where the person using the device can best operate on the cycle. Furthermore, the base plate 33 can have a plurality of holes 51 through which a pin (not shown) can be inserted into matching holes (not shown) in the arm 24 of the jack 20, and thus the pivoting of the cycle 27 about the kingpin 29 can be stopped and held securely at any desired location.

It is to be understood that the present invention may be embodied in other specific forms without departing from the spirit or special attributes; and it is, therefore, desired that the present embodiments be considered in all respects as illustrative and, therefore, not restrictive, reference being made to the appended claims rather than to the foregoing description to indicate the scope of the invention.

Having thus described the invention, what is claimed as new and desired to protect by Letters Patent are the following:

1. An attachment for lifting a two-wheeled vehicle by means of a lifting device, such as an automobile floor jack, the device having a base positionable on the ground and an upwardly movable arm connected to the base, the arm having a hole in an end thereof, the vehicle having frame members supporting wheels spaced in tandem along a longitudinal axis of the vehicle, the attachment comprising:

a flat base plate having an upper side and a lower side with a plurality of slots extending therethrough;

at least two pillow blocks mounted in said slots on the upper side of said base plate, said pillow blocks being formed to mate with the frame members of the vehicle when said base plate is brought into proximity with the vehicle, thereby to support the vehicle;

a kingpin connected to the lower side of said base plate for insertion into the hole in the arm of the device to attach the attachment to the lifting device so that upward movement of the arm raises the vehicle supported by the base plate off the ground; and an adjustable stand for additionally supporting the base plate and raised vehicle, the adjustable stand comprising:

at least two legs having a plurality of holes extending therethrough;

a connecting arm having an upper portion connected to the base plate at a point displaced from the kingpin, and at least two sleeves, one at each end of the connecting arm, for receiving the legs such that the legs are spaced from each other in a direction transverse to the longitudinal axis of the vehicle, said sleeves having holes extending therethrough to match the holes in said legs; and pins for insertion into the matching holes of the sleeves and the legs to connect the connecting arm to the legs, and adjust the length of the legs.

2. The vehicle lifting attachment according to claim 1 wherein the base plate further includes brackets for receiving an oil drain pan attachment.

3. The vehicle lifting attachment according to claim 1 wherein the kingpin pivots in the hole in the arm to swivel the base plate, and includes locking means for retaining the base plate, and position the vehicle, in a desired swivelled position.

4. The vehicle lifting attachment according to claim 3 wherein the base plate has a plurality of holes surrounding the kingpin through which a pin can be inserted to lock the base plate in place in the desired swivelled position.

5. The vehicle lifting attachment according to claim 1 further comprising at least one outrigger for attachment to the base of the lifting device, the outrigger comprising:

a vertical portion which can be fastened to the base of the lifting device;

a horizontal portion connected with the vertical portion to form an L-shaped outrigger; and wherein the vertical portion includes at least one slot extending therethrough for adjusting the height of the horizontal portion with respect to the ground, so that the outrigger may be raised during movement of the lifting device, and lowered to rest on the ground when the vehicle is raised by said lifting attachment.

6. The vehicle lifting attachment according to claim 5 wherein the outrigger further includes an angled portion connecting the vertical portion to the horizontal portion.

* * * * *